(12) United States Patent
Goulet (10) Patent No.: US 7,393,031 B2
(45) Date of Patent: Jul. 1, 2008

(54) STRAP LAUNCHING DEVICE AND METHOD OF USE

(76) Inventor: Hector Goulet, 101 Deerfield Rd., Windsor, CT (US) 06095-4208

(*) Notice: Subject to any disclaimer, the term of this patent is extended or adjusted under 35 U.S.C. 154(b) by 48 days.

(21) Appl. No.: 11/303,331

(22) Filed: Dec. 15, 2005

(65) Prior Publication Data

US 2006/0153657 A1 Jul. 13, 2006

Related U.S. Application Data

(60) Provisional application No. 60/636,593, filed on Dec. 16, 2004.

(51) Int. Cl.
*B25J 1/04* (2006.01)
(52) U.S. Cl. .................... 294/19.1; 410/97; 410/98; 410/99; 410/156; 294/24
(58) Field of Classification Search .............. None
See application file for complete search history.

(56) References Cited

U.S. PATENT DOCUMENTS 4,566,217 A * 1/1986 Geary, Sr.
5,454,611 A * 10/1995 Wanat .................... 294/24

* cited by examiner

*Primary Examiner*—Stephen Gordon
(74) *Attorney, Agent, or Firm*—Cantor Colburn LLP (57) ABSTRACT

A strap launcher (10) has a coil retainer (20) disposed at one end of a longitudinally-extending pole handle (16). Coil retainer (20) is configured to retain a coil (34a) of cargo strap (34) with the distal end of cargo strap (34) free and the other, proximal end (34b) of cargo strap (34) removably secured to the coil retainer (20). Strap launcher (10) is then used to launch the cargo strap (34) over a tall or stacked cargo (40) to dispose the distal end of cargo strap (34) on the far side of the cargo (40). The pole launcher (10) is then lowered to facilitate removal of the proximal end of the cargo strap (34) from the coil retainer (20). Both ends of cargo strap (34) are then secured to the truck bed in the known manner. Accessories such a corner handler (12), used to put corner protectors (42) in place, and a broom head (14), may be attached to the proximal end (16d) of pole handle (16).

9 Claims, 6 Drawing Sheets

STRAP LAUNCHING DEVICE AND METHOD OF USE

CROSS-REFERENCE TO RELATED APPLICATION

This application claims the benefit of priority of provisional Patent Application Ser. No. 60/636,593, entitled "Strap Launching Device", filed on Dec. 16, 2004, on behalf of Hector Goulet.

BACKGROUND OF THE INVENTION

1. Field of the Invention

The present invention is concerned with a device for launching straps, for example, for launching cargo straps over a load of cargo, especially over stacked or high cargo contained on the bed of a truck or the like, and to a method of using the device.

2. Related Art

Generally, truckers, warehouse personnel and others concerned with the loading or transport of cargo manually drape cargo straps over a load to retain the cargo in place during transit. In the case of stacked or tall loads, the strap is formed into a coil and manually thrown over the cargo, or one must climb atop the cargo in order to drape the strap over the cargo. In either case, the opposite ends of the draped straps are then secured in place.

SUMMARY OF THE INVENTION

Generally, there is provided in accordance with the present invention a strap launcher device and a method of using the same. The strap launcher comprises an elongate pole handle having at one end a coil retainer which releasably holds a coiled strap, e.g., a cargo strap, with one end of the coiled strap (the distal end) free and the other end (the proximal end) connected to the strap launcher. In use, the pole handle of the strap launcher is held at or adjacent the end remote from the coil retainer. The cargo loader or other user of the device then employs the launching device somewhat in the manner of casting a fly fishing rod, to propel the coiled strap out of the coil retainer and over the cargo or other structure to deposit the free end of the strap over the side of the cargo or other structure opposite to that at which the loader or other user is positioned. The end of the strap connected to the coil retainer is then detached and secured to the truck bed or other structure, e.g., a pallet, on which the cargo or other structure is disposed. The loader or other user or a helper then secures the free end of the strap to the other side of the truck bed or other structure. The cargo strap is tightened in the known manner to help retain the cargo in place.

Specifically, in accordance with the present invention there is provided a strap launcher comprising the following components. A pole handle having a launch end and an opposite, proximal end has a coil retainer mounted on its launch end, which coil retainer is dimensioned and configured to releasably retain thereon a coiled strap having a proximal end, with the proximal end removably secured to the coil retainer. Consequently, imposition of a casting action on the pole handle launches the coiled strap from the coil retainer while retaining the proximal end of the strap secured to the strap launcher during launch of the coil.

In one aspect of the present invention, the strap launcher further comprises an adjustable extension arm on which the coil retainer is mounted. The extension arm, which optionally may be coaxial with the pole handle, is located at the launch end of the pole handle and is dimensioned and configured to protrude from the pole handle in selected different amounts to provide selected different overall lengths of the strap launcher.

In another aspect of the present invention, the coil retainer comprises an arcuate coil rest having side fences and defining a receptacle which is dimensioned and configured to retain such coiled strap therein and which defines an ejection opening through which the coil strap may be ejected from the coil retainer by inertial force.

In another aspect of the present invention, the coil retainer further comprises a retaining slot which is dimensioned and configured to retain the proximal end of such strap during launch of the coil, and to permit release of the proximal end of the strap from the coil retainer after launch.

Other aspects of the present invention provide one or more of the following aspects, alone or in suitable combinations of two or more: the strap launcher may further comprise a curved strap rest extending from the coil retainer on the side thereof opposite the ejection opening, and the retaining slot may be formed in the curved strap rest; the proximal end of the pole handle may comprise a pole connection fixture which is dimensioned and configured to have an accessory mounted thereon; the accessory may comprise a handler for a corner protector, the handler being dimensioned and configured to retain a corner protector for emplacement on a structure, and to release the corner protector after its emplacement; and the accessory comprises a broom head.

A method aspect of the present invention provides for launching a strap over a structure by means of a strap launcher comprising a pole handle having a launch end at which a coil retainer is mounted. The method comprises the steps of: coiling the strap to provide a strap coil having a proximal end; placing the strap coil into the coil retainer, which is dimensioned and configured to releasably retain the strap coil so that the strap coil may be ejected therefrom by inertial force; securing the proximal end of the strap to the strap launcher, for example, by securing the proximal end of the strap to the coil retainer; launching the coil over such structure by imposing a casting motion on the pole handle of the strap launcher; and, after the launching step, detaching the proximal end of the strap from the strap launcher.

In another method aspect of the present invention, wherein the strap launcher further comprises an adjustable extension arm protruding from the pole handle and on which the coil retainer is mounted, the method further comprises the step of adjusting the amount by which the extension arm protrudes from the pole handle to establish a selected overall length of the strap launcher, this adjusting step being carried out prior to the launch step.

In yet another method aspect of the present invention, wherein the pole member has a proximal end opposite the launch end, the proximal end comprising a pole connection fixture on which an accessory comprising a handler is mounted, the method further comprising the steps of (a) placing a corner protector in the handler, (b) using the strap launcher to emplace the corner protector atop the structure at an edge thereof and removing the handler from the corner protector, (c) repeating steps (a) and (b) to so emplace a plurality of corner protectors, carrying out steps (a), (b) and (c) prior to launching such strap, and (d) launching such strap so as to deposit the strap over one or more of the corner protectors.

Other aspects of the present invention will be apparent from the following description.

BRIEF DESCRIPTION OF THE DRAWINGS

The drawings illustrate one embodiment of the strap launcher of the present invention and the use thereof, in which FIGS. 1A through 1G are enlarged relative to FIG. 1, and wherein:

DETAILED DESCRIPTION OF THE INVENTION AND SPECIFIC EMBODIMENT THEREOF

The placement of straps, e.g., cargo straps, over a structure such as tall or wide, or stacked cargo is often problematic because of the difficulty in draping the cargo strap over the cargo with a sufficient length of strap on each side of the cargo to enable opposite ends of the strap to be secured to a truck bed or other structure carrying the cargo. Usually, a number of straps are required to secure a load of cargo. If the loader is standing on the ground, it is necessary to throw a series of straps above and over the cargo at spaced intervals. In order to be able to do so, it is necessary to coil the strap. This is conventionally done by the loader coiling the strap and holding one end of the coiled strap in his hand and throwing the coiled strap over the cargo. Often, a throw is not successful, i.e., it falls short, and must be repeated, sometimes several times, before the free end of the strap clears the cargo and falls to the other side. Each repeated attempt requires retrieving and re-coiling the strap. The alternative is for the loader to climb atop the cargo, which presents its own difficulties and dangers, especially in icy conditions or rainy weather, and drape the cargo straps over the cargo, with one end dangling on either side.

The strap launcher of the present invention overcomes these difficulties and enables rapid and efficient placement of cargo straps or the like without undue strain on the shoulder and arm of the loader, and without need to climb atop the cargo or other structure which is to be strapped in place. For example, the "structure" may be a cargo or other container, a plurality of stacked containers, a plurality of other stacked objects or a single object, or the like. As used herein and in the claims the term "structure" is intended to embrace all the foregoing.

Figures 1, 1A:
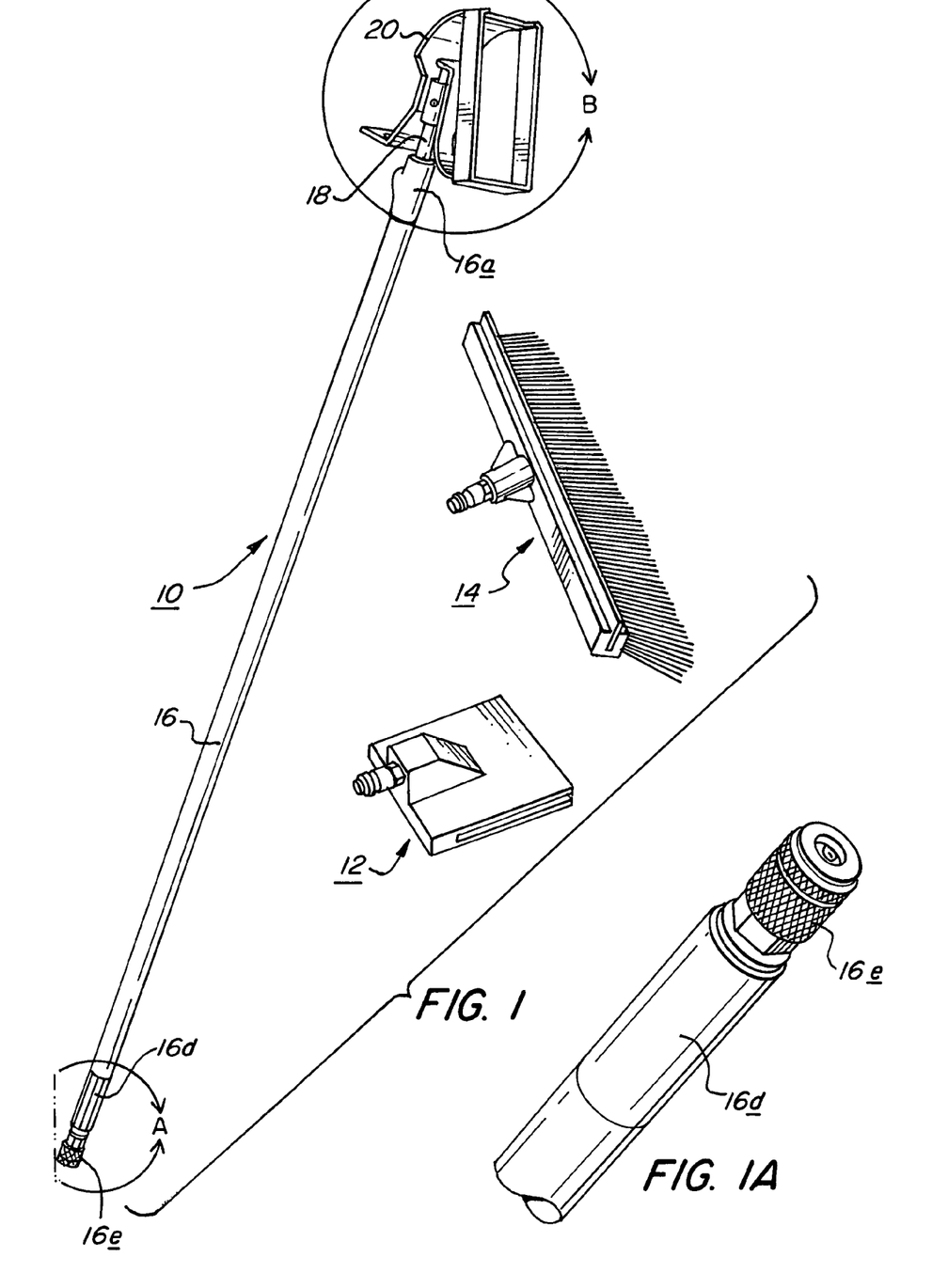
FIG. 1 is a perspective, exploded view of a strap launcher and two accessories, a corner handler and a broom head, which are alternately attachable to the strap launcher.
FIG. 1A is a perspective view of that portion of FIG. 1 enclosed within area A.

FIG. 1 shows a strap launcher 10 and, separately, a pair of accessories comprising a corner handler 12 and a broom head 14. These accessories, and their use, are described below. Strap launcher 10 comprises a pole handle 16 which is a hollow tube within which is slidably received an extension arm 18 which has spaced along its length a series of detent holes 18a, as best seen in FIG. 1G. Extension arm 18 has a mounting hole 18b which extends transversely through it, at a location adjacent to retainer end 18c of extension arm 18. A coil retainer 20 is mounted on extension arm 18, and its structure and use are described below.

Figures 1B, 1C, 1D:
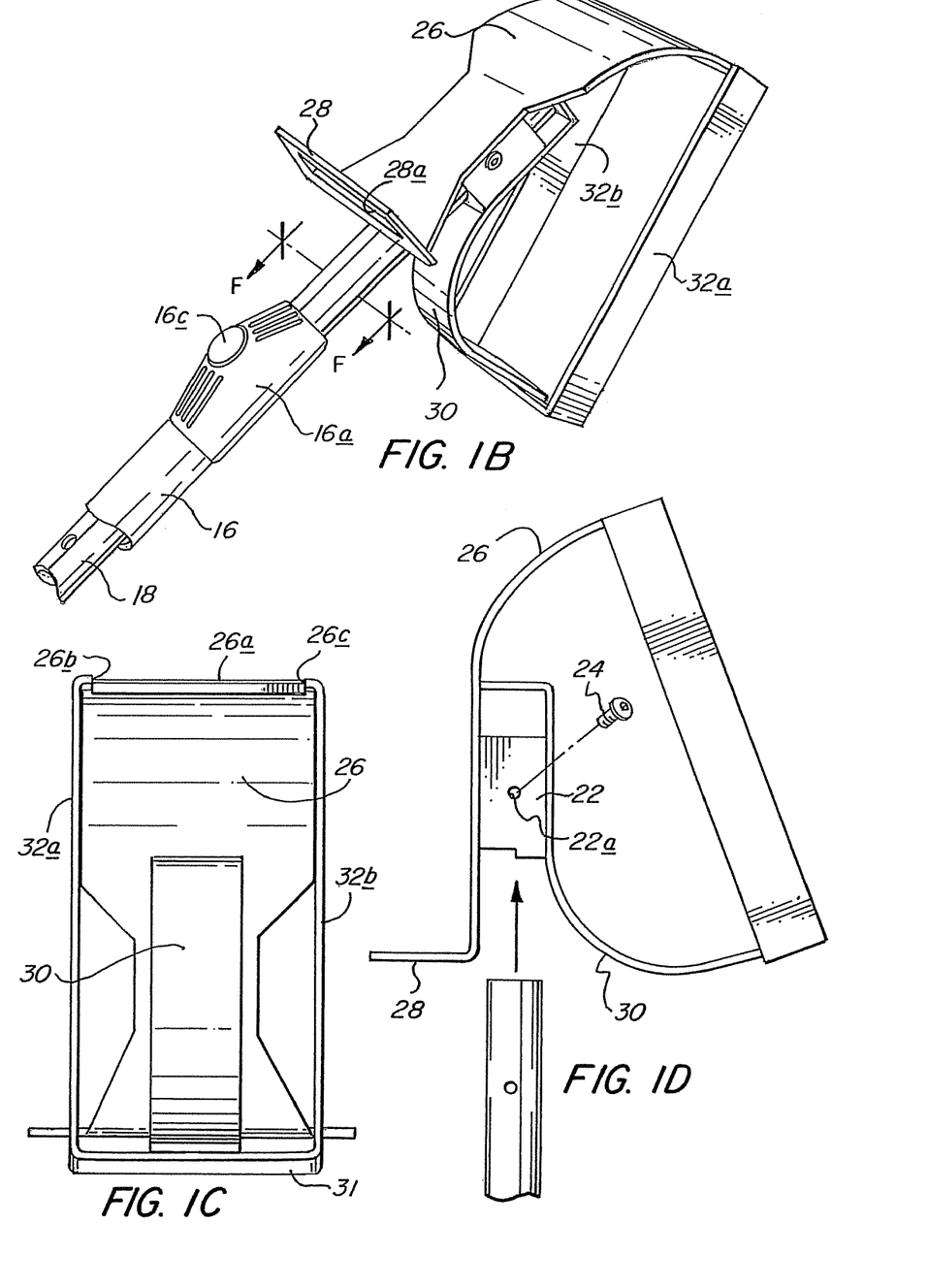
FIG. 1B is a perspective view of that portion of FIG. 1 enclosed within area B.
FIG. 1C is a bottom plan view of the coil retainer component of the strap launcher of FIG. 1.
FIG. 1D is an exploded side view of the coil retainer component and a portion of the extension arm component of the strap launcher of FIG. 1.
Figure 1E:
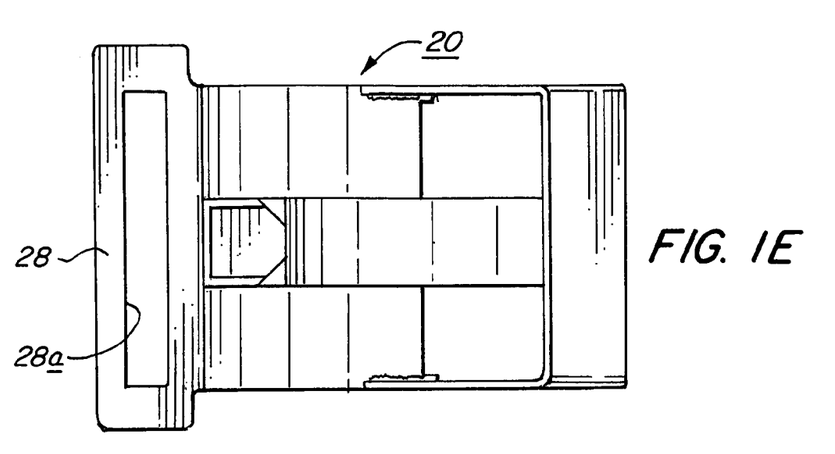
FIG. 1E is a top plan view of the coil retainer of the strap launcher of FIG. 1.
Figure 1F:
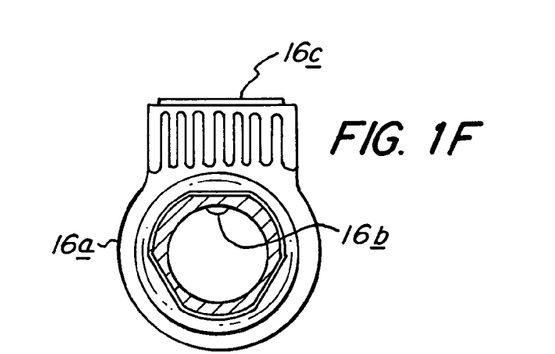
FIG. 1F is a cross-sectional view taken along line F-F of FIG. 1B.
Figures 1G, 2A:
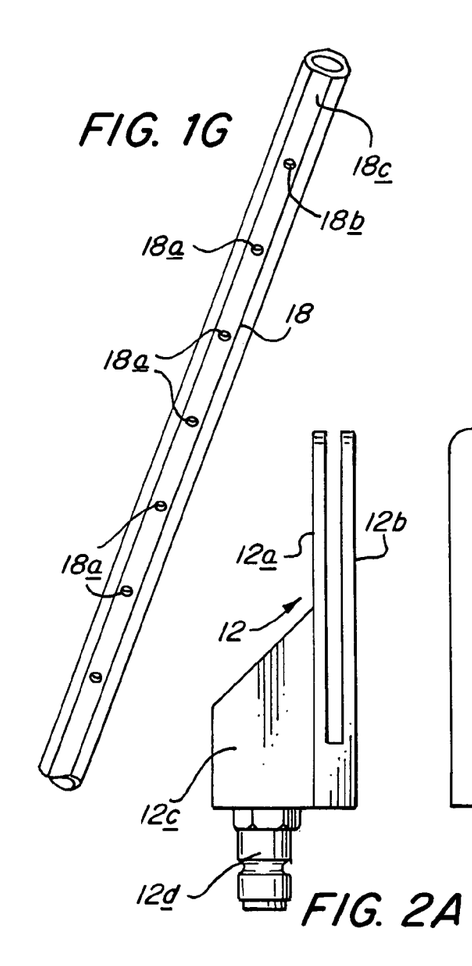
FIG. 1G is a partial perspective view of the extension arm component of the strap launcher of FIG. 1.
FIG. 2A is a side elevation view and FIG. 2B is a front elevation view of the corner handler accessory shown in FIG. 1.

Referring now to FIGS. 1B, 1F and 1G, pole handle 16 has thereon a detent housing 16a containing a detent member 16b (FIG. 1F) which is spring-loaded by a spring mechanism (not shown) which urges detent member 16b into engagement with a selected one of detent holes 18a of extension arm 18. A release button 16c (FIGS. 1B and 1F), when depressed, releases the pressure exerted on detent member 16b by the spring mechanism, to facilitate withdrawal of detent member 16b from a given detent hole 18a when it is desired to adjust the amount of protrusion of extension arm 18 from pole handle 16. In this way, by selecting an appropriate one of detent holes 18a to be engaged by detent member 16b, the effective overall length of strap launcher 10 can be adjusted to meet the length requirements of a particular situation. It is seen that the strap launching device of the invention may be of telescoping construction so that its effective length may be adjusted to accommodate different heights of cargo. Thus, in one embodiment, an adjustable extension arm is contained within the pole handle and the coil retainer is carried on the extension arm. Pole handle 16 has a proximal end 16d on which is carried a pole connection fixture 16e.

Referring now to FIGS. 1 and 1B through 1E, there is shown a coil retainer 20 which is mounted on retainer end 18c of extension arm 18. Coil retainer 20 has a mounting flange 22 containing a pair of bolt holes 22a (only one of which is visible in FIG. 1D). A bolt 24 or any other suitable fastening means secures coil retainer 20 to the retainer end 18c of extension arm 18 by passing bolt 24 through bolt holes 22a and mounting hole 18b (FIG. 1D).

Coil retainer 20 (FIG. 1E) is comprised of a curved strap rest 26 (FIG. 1B) which terminates at one end in a retainer flange 28 that extends transversely from strap rest 26 and has formed therein a retainer slot 28a, best seen in FIGS. 1E and 1B. Mounting flange 22 (FIG. 1D) is secured, for example, by welding, to the inner side of strap rest 26. A transverse edge 26a (FIG. 1C) of strap rest 26 is recessed relative to corner edges 26b and 26c. Transverse edge 26a and corner edges 26b and 26c cooperate to provide a strap guide for cargo strap 34 (not shown in FIG. 1C), as described below. An arcuate coil rest 30 extends from mounting flange 22 to spaced-apart side fences 32a, 32b and is welded or otherwise secured to a cross fence 31. As may be best appreciated from FIG. 1C, the transverse edge 26a of strap rest 26, cross fence 31 and side fences 32a, 32b cooperate to form a generally rectangular ejection opening to receive a coiled cargo strap or the like, and to permit ejection of the coiled strap from the coil retainer 20.

Mounting flange 22 is of open construction and is configured to slidably receive therein retainer end 18c of extension arm 18. Retainer end 18c is inserted within mounting flange 22 so that mounting hole 18b coincides with bolt holes 22a, so that coil retainer 20 may be secured to extension arm 18 by bolt 24 passed through bolt holes 22a and mounting hole 18b. A suitable nut (not shown) or other appropriate means is used to secure bolt 24 in place. Obviously, if desired, coil retainer 20 could be secured to extension arm 18 by any suitable means including rivets, welding, or the like.

Figure 2B:
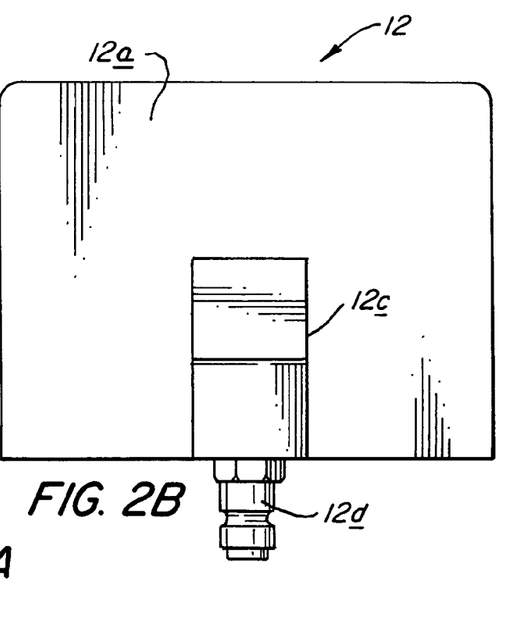

As shown in FIGS. 2A and 2B, a corner handler 12 comprises a pair of spaced-apart retainer plates 12a and 12b carried on a center post 12c. A connector fixture 12d is carried on the end of center post 12c. The use of corner handler 12 is described below.

Figures 3A, 3B, 3C:
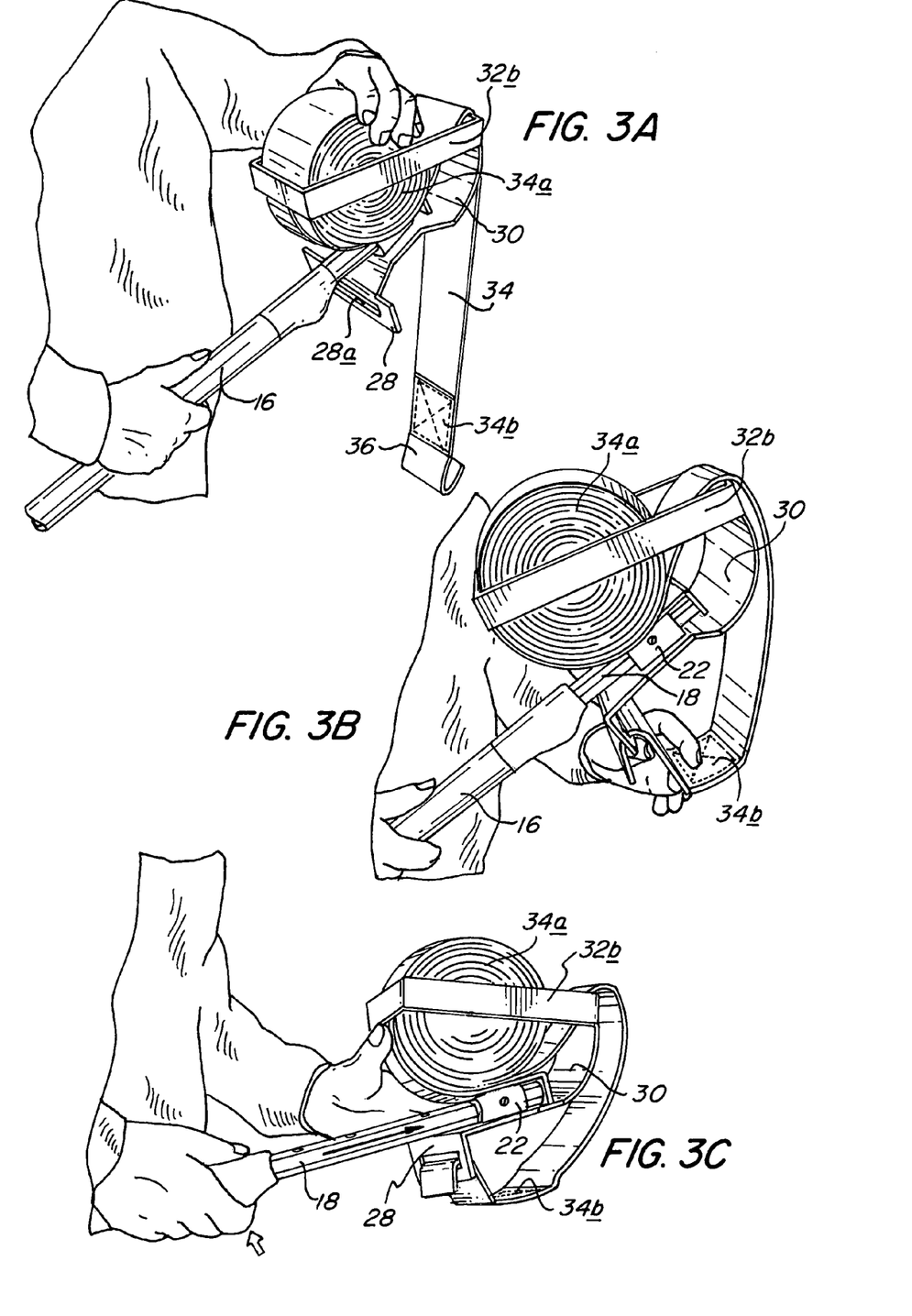
FIGS. 3A, 3B and 3C are partial perspective views illustrating the mounting of a coiled cargo strap onto the coil retainer of the strap launcher of FIG. 1.

Referring now to FIGS. 3A, 3B and 3C, the placement of a coil 34a of cargo strap 34 into strap launcher 10, more specifically, into coil retainer 20 of strap launcher 10, is illustrated. A cargo strap 34 has formed at each end the usual rigid retainer clip 36, only the one connected to proximal end 34b of cargo strap 34 being visible in FIGS. 3A-3C because the retainer clip at the other, distal end of cargo strap 34 is located at the center of the coil 34a and is hidden from view in FIGS. 3A-3C by side fence 32b. The distal end (not shown) of cargo strap 34 has affixed to it a retainer clip (not shown) identical or similar to retainer clip 36. Coil 34a is, as illustrated in FIG. 3A, placed within the rectangular opening of coil retainer 20, coil 34a resting on the interior of coil rest 30. A terminal length of cargo strap 34 is left uncoiled as seen in FIG. 3A, to enable retainer clip 36 to be placed within retainer slot 28a of retainer flange 28. Once retainer clip 36 is seated within retainer slot 28a, if necessary, coil 34a is rotated sufficiently to shorten the uncoiled terminal length of cargo strap 34, which overlies the exterior of strap rest 26 as seen in FIG. 3C. Strap 34 passes over recessed transverse edge 26a and is guided between corner edges 26b and 26c.

Figure 4:
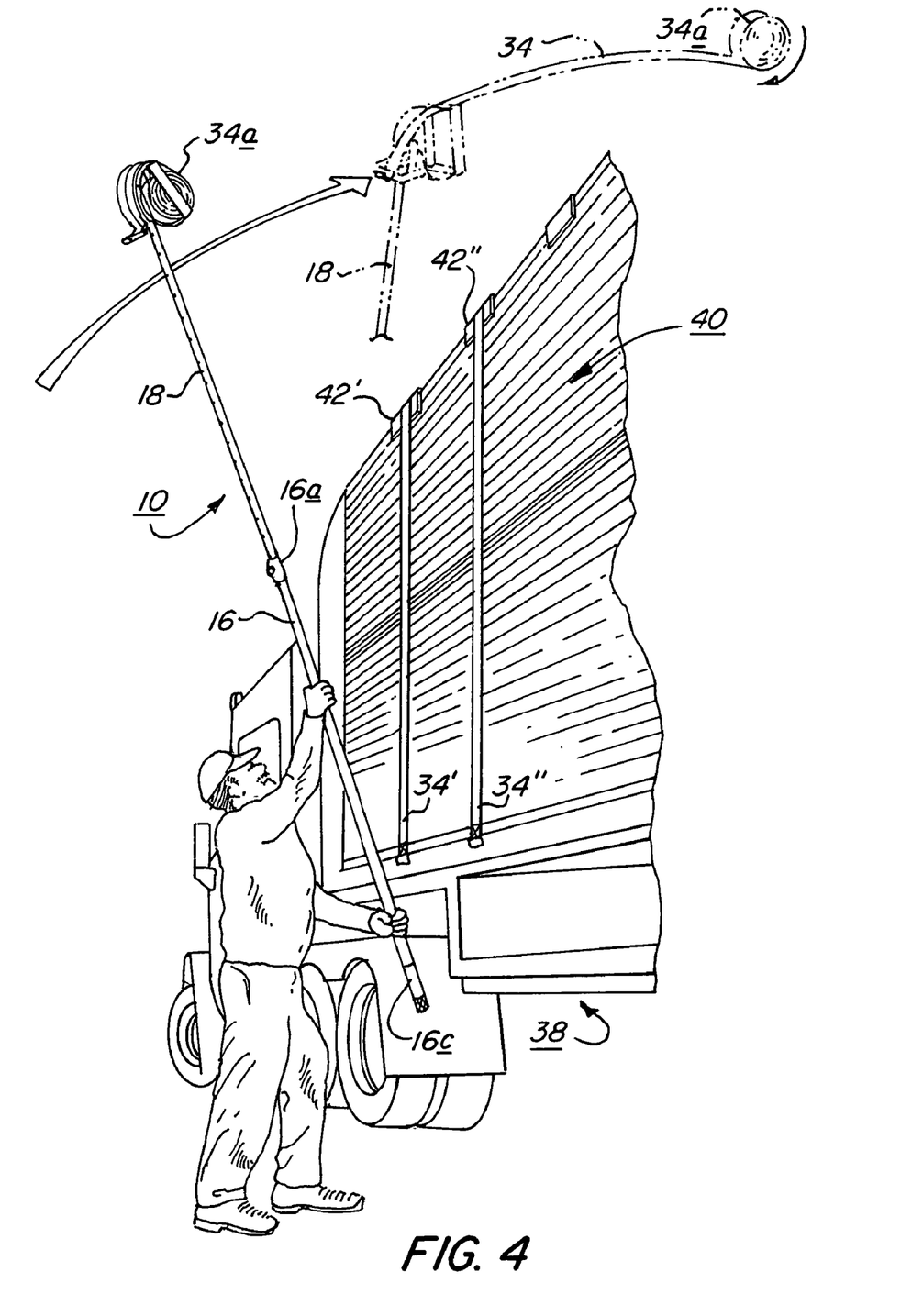
FIG. 4 is a perspective view illustrating use of the strap launcher of FIG. 1 to launch a cargo strap over a load of cargo on a flat bed truck.

FIG. 4 shows a partial view of a flat bed truck 38 on which is stacked a cargo 40. Two cargo straps 34' and 34" are shown in place, with one of their terminal ends secured to the flat bed truck 38. Corner protectors 42', 42" are placed at the top edges of cargo 40 to prevent cargo straps 34', 34" cutting into the top layer of cargo. For example, cargo 40 may be comprised of styrofoam sheets or other material which would be marred or damaged by cinching of the cargo straps 34', 34" over cargo 40. The opposite terminal ends (not shown) of cargo straps 34', 34" are similarly secured to the opposite side of flat bed truck 38 and another set of corner protectors (not shown) are positioned under cargo straps 34', 34" at the opposite top edge of cargo 40. The use of such corner protectors is known, but they are conventionally emplaced by hand, thereby requiring the loader to climb atop the cargo or use a ladder.

The loader is shown grasping the lower end of strap launcher 10 with coil 34a positioned within coil retainer 20 as illustrated in FIG. 3C. The loader uses strap launcher 10 somewhat in the manner of fly-casting a fishing pole. The loader's hands are spaced apart, one hand near the proximal end 16d of pole handle 16, the other hand farther from proximal end 16d. Strap launcher 10 is moved sharply forward in the direction shown by the unnumbered arrow in FIG. 4 and brought to a sudden stop so that coil 34a is propelled outwardly by inertial force as shown in phantom outline in FIG. 4, and is thrown over cargo 40. This or a similar use of the strap launcher of the present invention to attain the result of launching the coiled strap, is in the claims and sometimes herein, referred to as the imposition of a "casting action" on the pole handle of the strap launcher. As coil 34a unrolls, the distal end of cargo strap 34 falls to the opposite side of cargo 40. The proximal end of cargo strap 34 remains connected to coil retainer 20 because of the engagement of retainer clip 36 (FIGS. 3B and 3C) with retainer slot 28a. The loader then lowers strap launcher 10 and secures the proximal end of cargo strap 34 by retainer clip 36 or otherwise, to the bed of flat bed truck 38. When the required number of cargo straps have been launched over cargo 40 and the proximal ends thereof have been secured to the bed of flat bed truck 38, the loader goes to the opposite side of the flat bed truck 38 and secures the distal ends of the cargo straps to the other side of the bed of flat bed truck 38.

The pole handle may have a fitting on it which is configured to accept an accessory to be removably mounted thereon, thereby enabling use of the pole handle to carry out functions other than launching a coiled cargo strap.

The accessory may comprise a corner handler which is removably attachable to the pole handle, or it may comprise a broom head which is removably attachable to the pole handle, or any other suitable accessory such as an ice or snow scraper.

Figures 5, 6:
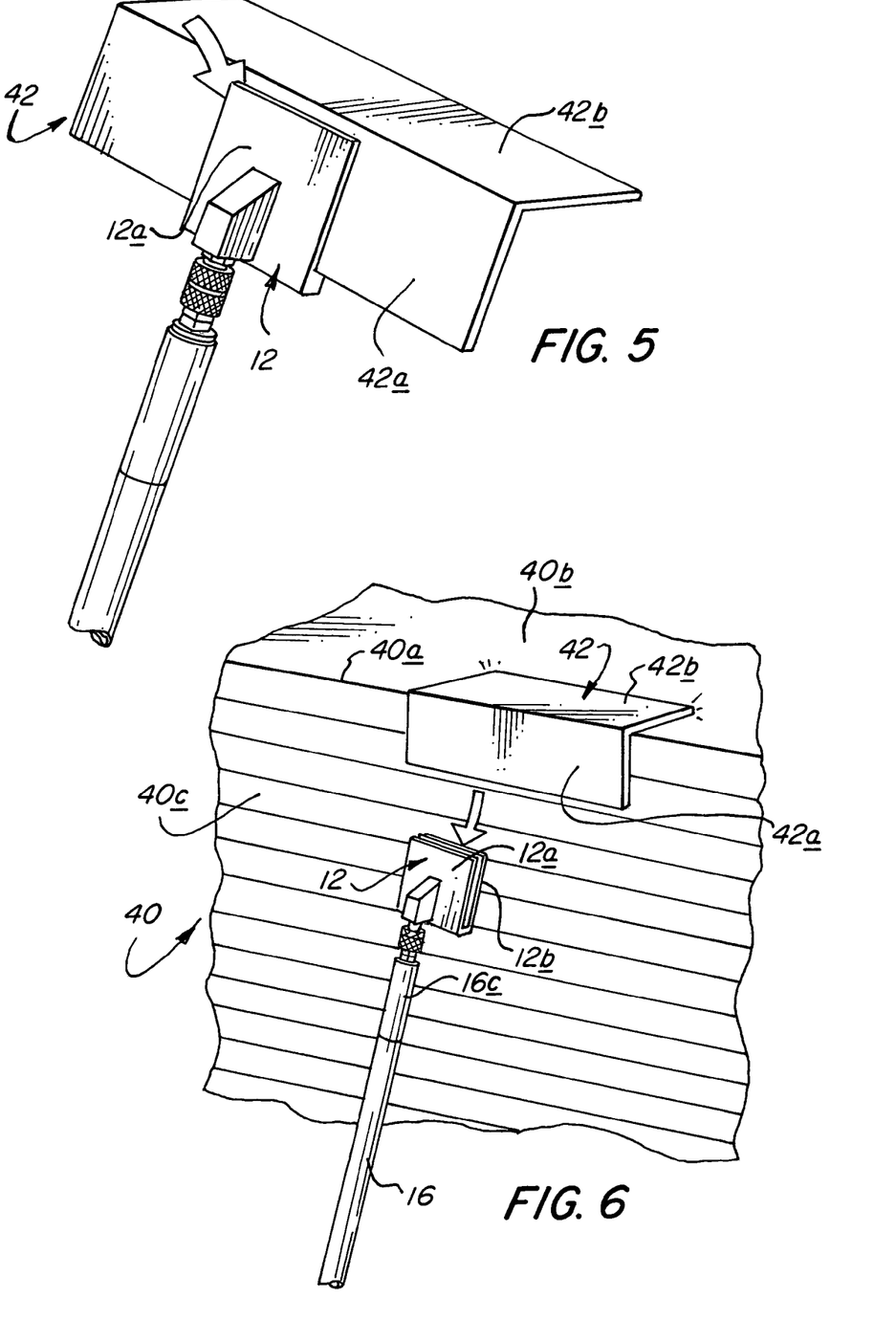
FIG. 5 is a partial perspective view of the strap launcher of FIG. 1 with the corner handler of FIGS. 2A and 2B mounted thereon.
FIG. 6 is a partial perspective view which illustrates the placement of a corner protector onto a cargo load using the corner handler of FIG. 5.

In a case where corner protectors 42 are to be utilized, the accessory may be a corner handler 12 (FIGS. 2A and 2B) which the loader attaches to the proximal end 16d of pole handle 16 (FIG. 1A) by screwing connection fixture 12d of corner handler 12 to pole connection fixture 16e. As shown in FIGS. 5 and 6, corner protector 42 is comprised of two flanges, 42a and 42b, disposed at a right angle to each other, and is made of any suitable material, such as thin steel or a rigid plastic material. The operator inserts flange 42a between retainer plates 12a, 12b as illustrated in FIG. 5, in which the unnumbered arrow shows the direction of movement of flange 42a between retainer plates 12a and 12b. Pole handle 16 is then raised to position the proximal end 16d thereof adjacent to top edge 40a of cargo 40 with the interior juncture of flanges 42a and 42b aligned with the top edge 40a. Pole handle 16 is then withdrawn in the direction indicated by the unnumbered arrow in FIG. 6, leaving corner protector 42 behind with flange 42b resting on the horizontal surface 40b of cargo 40 and flange 42a extending for a short distance along the vertical surface 40c of cargo 40. Corner protectors 42', 42", etc., are positioned under the cargo straps 34', 34", etc.

Corner handler 12 may be removed from pole handle 16 and replaced by broom head 14, which has a broom connector fixture 14a affixed thereto which may be secured to pole connection fixture 16e. Strap launcher 10 may thus be used as a broom to clean dirt or debris from the truck bed or the cargo 40, as required. Coil retainer 20 or extension arm 18 with coil retainer 20 affixed thereto may, but need not, be removed from pole handle 16 to facilitate its use as a broom.

While the invention has been described with respect to a particular embodiment thereof, it will be appreciated that numerous variations may be made to the illustrated embodiment which variations nonetheless lie within the scope of the present invention.

What is claimed is:

1. A strap launcher comprising:
   a pole handle having a launch end and an opposite, proximal end;
   a coil retainer mounted on the launch end and dimensioned and configured to releasably retain thereon a coiled strap having a proximal end, with the proximal end removably secured to the coil retainer;
   whereby, imposition of a casting action on the pole handle launches the coiled strap from the coil retainer while retaining the proximal end of the strap secured to the strap launcher during launch of the coil.

2. A strap launcher comprising:
   a pole handle having a launch end and an opposite, proximal end;

a coil retainer mounted on the launch end and dimensioned and configured to releasably retain thereon a coiled strap having a proximal end, with the proximal end removably secured to the coil retainer;

an adjustable extension arm on which the coil retainer is mounted, the extension arm being located at the launch end of the pole handle and being dimensioned and configured to protrude from the pole handle in selected different amounts to provide selected different overall lengths of the strap launcher;

whereby, imposition of a casting action on the pole handle launches the coiled strap from the coil retainer while retaining the proximal end of the strap secured to the strap launcher during launch of the coil.

3. The strap launcher of claim 2 wherein the adjustable extension arm is coaxial with the pole handle.

4. The strap launcher of claim 1 or claim 2 wherein the coil retainer comprises an arcuate coil rest having side fences and defining a receptacle which is dimensioned and configured to retain such coiled strap therein, and the coil retainer farther defines an ejection opening thereof through which the coiled strap may be ejected from the coil retainer by inertial force.

5. The strap launcher of claim 1, claim 2 or claim 3 wherein the coil retainer further comprises a retaining slot which is dimensioned and configured to retain the proximal end of such strap during launch of the coil, and to permit release of the proximal end of the strap from the coil retainer after launch.

6. The strap launcher of claim 5 wherein the coil retainer defines an ejection opening through which the coiled strap may be ejected from the coil retainer by inertial force, and the strap launcher further comprises a curved strap rest extending from the coil retainer on the side thereof opposite the ejection opening, and the retaining slot is formed in the curved strap rest.

7. The strap launcher of claim 1 or claim 2 wherein the proximal end of the pole handle comprises a pole connection fixture which is dimensioned and configured to have an accessory mounted thereon.

8. The strap launcher of claim 7 wherein the accessory comprises a handler for a corner protector, the handler being dimensioned and configured to retain a corner protector for emplacement on a structure, and to release the corner protector after its emplacement.

9. The strap holder of claim 7 wherein the accessory comprises a broom head.

* * * * *